Feb. 26, 1963 W. BOTTLÄNDER 3,078,780
VENTILATING ARRANGEMENT FOR BUILDINGS, MORE
ESPECIALLY GREENHOUSES
Filed Nov. 18, 1959 3 Sheets-Sheet 1

INVENTOR.
WILFRIED BOTTLÄNDER
BY
ATTORNEY

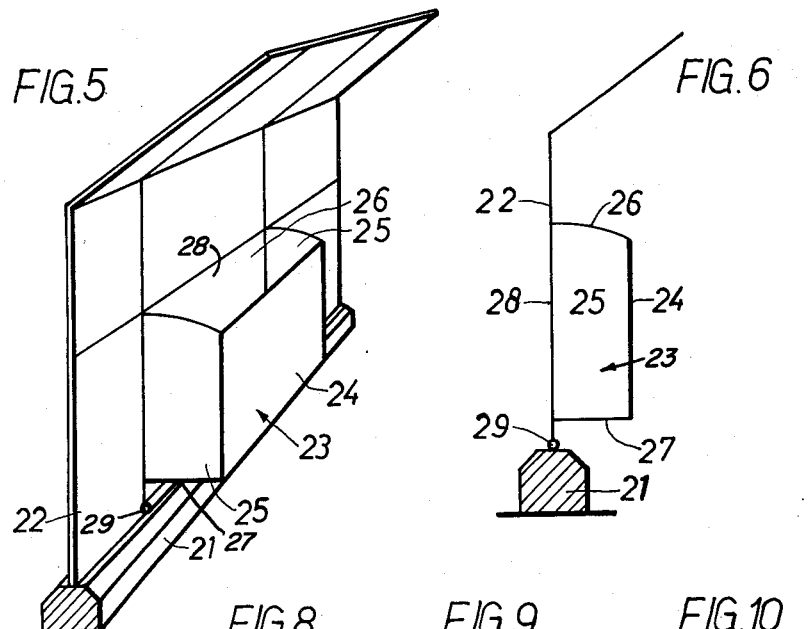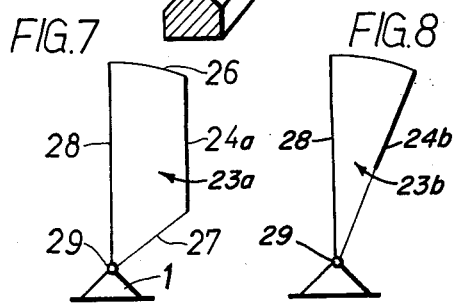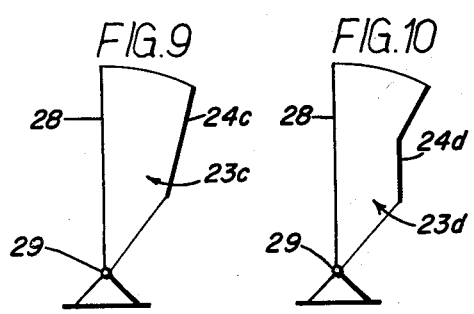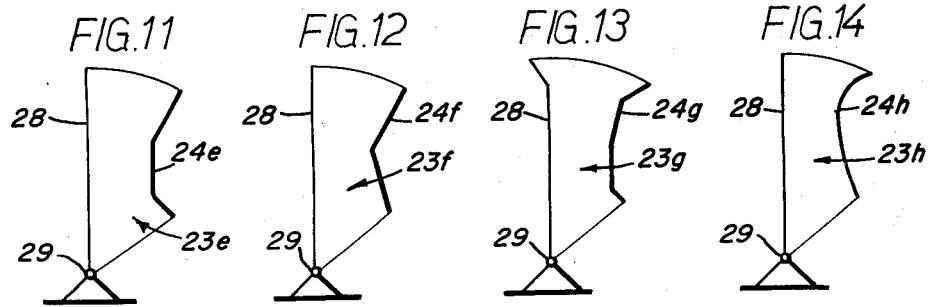

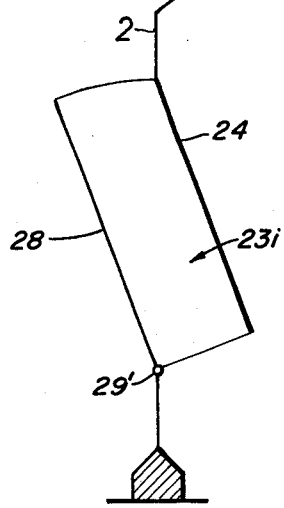
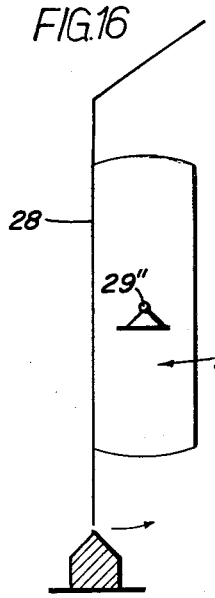
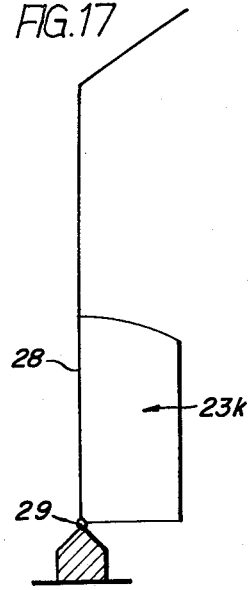
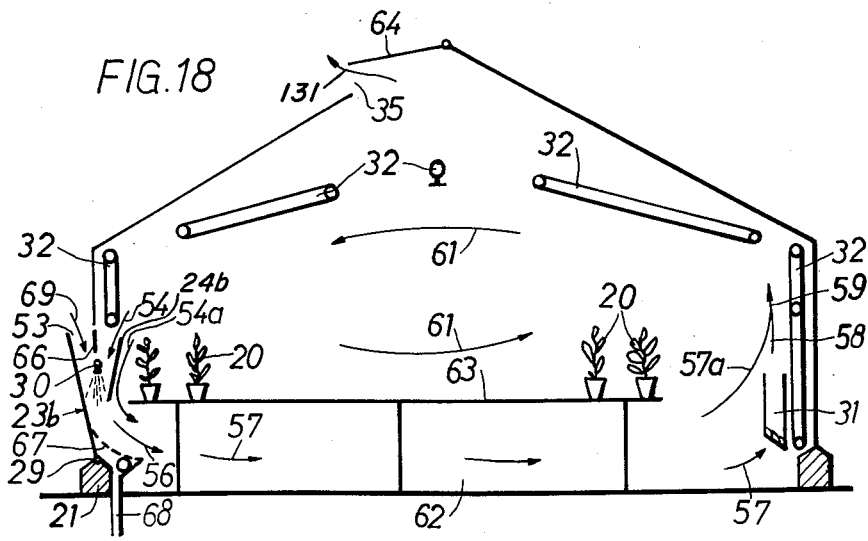

United States Patent Office 3,078,780
Patented Feb. 26, 1963

3,078,780
VENTILATING ARRANGEMENT FOR BUILDINGS, MORE ESPECIALLY GREENHOUSES
Wilfried Bottländer, Farbenfabriken Bayer AG, Leverkusen, Germany
Filed Nov. 18, 1959, Ser. No. 853,744
Claims priority, application Germany Nov. 24, 1958
6 Claims. (Cl. 98—37)

This invention relates to ventilating arrangements for buildings, more especially greenhouses, to improve their heating, ventilating and general air conditioning.

The aim of any air-conditioning plant is to maintain uniform temperature, humidity and velocity in the space to be conditioned with the least air flow possible. This is partly achieved by good insulation of all walls where possible by heat insulation material. Windows have a low insulating effect due to dissipation through the glass and cracks between the frames; glass allows sunlight to enter the space and be converted therein into useful heat. This leads to frequent and rapid changes in the load of the air conditioning plant and considerably impedes and makes more costly the air conditioning effect. Accordingly, the problem of air conditioning completely glassed greenhouses places heavy demands on the air conditioning system.

These requirements reach their peak when meeting the following ideal conditions:

(a) The air velocity should as far as possible not exceed 0.30 m./sec.; the air in the region of plants should be uniformly or constantly renewed to avoid dead spots.

(b) The light enjoyed by the plants should be as great as possible except that on sunny days the plants require shading sometimes and the air conditioning apparatus should not interfere with the light.

As this has been done heretofore, an ideal installation and the operational costs of a greenhouse air conditioned to meet these requirements would be 5 to 8 times the cost of the greenhouse itself. Consequently, heretofore very few air conditioned greenhouses have been installed except for research purposes. In such, the desired uniformity of conditions of temperature, moisture, and air movement have not been fully realized. The standard tolerances for cold weather and hot summer conditions are plus or minus 1.5° C., plus or minus 15% relative humidity, and plus or minus .20 m./sec. air velocity.

By the present invention, the above disadvantages are avoided by the use of a ventilating arrangement constructed in a side wall of the house and provided with two opposed faces forming a passage between them. The ventilator is arranged to swivel or tilt about a horizontal axis, preferably at the end of one of the faces or walls. By this means, a ventilator is provided through which supply and discharge air streams can be led. The air streams are induced partly by convection, producing a difference in air pressure between the fresh air opening and the outlet vent, and flow may be assisted also by the injection effect of a spray device installed in the ventilator.

The invention will be more completely understood by reference to the accompanying drawings and the following description. For simplicity, the drawings are in outline and diagrammatic in character.

In the drawing:

FIG. 1 indicates diagrammatically the side wall of a greenhouse provided with a ventilator constructed in accordance with the practice of the invention;

FIG. 5 is a perspective showing a further hinged form of ventilator modification;

FIG. 6 is a sectional view of the ventilator of FIG. 5, substantially transverse to the ventilator;

FIG. 7 is the diagrammatic view of a modified form of ventilator in cross section;

FIG. 8 is a modified form of ventilator shown in cross section;

FIG. 9 is a modification similar to FIG. 8 in which the inner wall of the ventilator has a less exaggerated slant;

FIG. 10 is a further modification, also in transverse section;

FIG. 11 is a transverse section of a ventilator with a modified form of inner wall;

FIG. 12 is a transverse section of a ventilator with a further modification of the inner wall;

FIG. 13 is a still further modification of the ventilator with the inner and outer walls shaped for the introduction of a constant supply of fresh and recirculated air;

FIG. 14 is a modified form of the invention in section, the inner wall being curved to meet special conditions;

FIG. 15 is a transverse view of the house wall with the ventilator at the bottom edge and spaced from the wall foundation;

FIG. 16 is a transverse section in which the ventilator is centrally hinged;

FIG. 17 is a transverse section of greenhouse wall and ventilator with the ventilator shown mounted at the wall foundation; and FIG. 18 is a transverse section of a greenhouse provided with a ventilator constructed in accordance with the invention at one side wall and showing the heating units for producing the air currents and the discharge vent in the roof.

Figure 1:
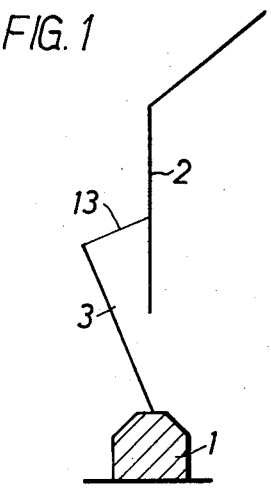

Referring to the drawings, FIG. 1 shows a ventilator 3 mounted fixedly on the foundation 1 of the side wall 2 of the greenhouse forming an air inlet shown at 13, which in this instance is fixed. The degree of opening at 13 has been calculated to accommodate the required air supply.

Figure 2:
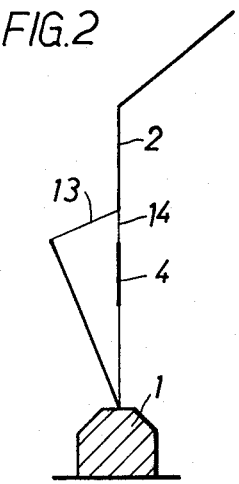
FIG. 2 shows an arrangement similar to FIG. 1 with the exception of a modified wall section.

In FIG. 2, the wall 2 is modified so as to provide an opening 14 between the lower edge of wall 2 and the lower section 4. The opening 14 provides a circulation passage.

Figure 3:
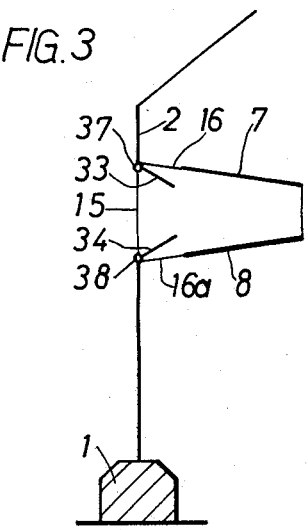
FIG. 3 is a modification of the invention in which the wall of the greenhouse, shown diagrammatically in transverse section, is provided with a ventilator of a modified form.

In FIG. 3 an opening 15 in the side wall 2 leads into a ventilator formed by two slightly converging walls 7 and 8 projecting into the greenhouse. Openings 16 and 16a are provided to admit recirculating air into the space between walls 7 and 8 to commingle with entering air at side wall opening 15. Regulation of relative amounts of air from the outside and that to be recirculated from the inside are controlled by blades 33 and 34 acting as valves and pivoted at hinges 37 and 38 respectively. This construction has the advantage that when there is little or no need for fresh air from the outside, the heating of the wall surface adjacent walls 7 and 8 can easily be effected by air introduced at the openings 16 and 16a.

Figure 4:
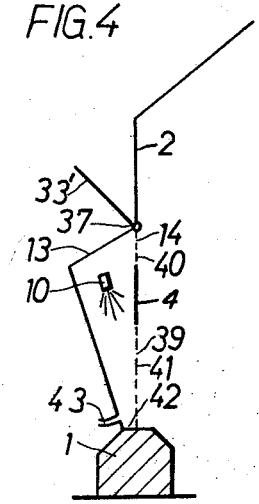
FIG. 4 is a modification of the ventilator showing a spray nozzle for injecting the propelling moisture.

FIG. 4 is similar to FIG. 2 in that the ventilator is stationary but the opening 13 is controlled by a swinging plate or door 33′ and circulation is induced by a spray jet 10 directed away from inlet 13. Screens 40 and 41 cover the inlet 14 and the lower opening 39 to the inside of the greenhouse. Screen 41 also serves to separate moisture from the water which can escape to the outdoors from space 42 through an overflow pipe 43. Spray jet 10 and the closure 33' both have the effect of controlling the flow into inlet 13 and they may be operated individually or together. The amount of regulation will depend upon the degree of humidity within the greenhouse.

In FIG. 5 is shown a modified form of ventilator that may be described as a box with two opposite ends removed and standing on the edge of one of the open ends. The ventilator or box shown at 23 thus has two end walls 25, an outer vertical wall 28 and an inner wall 24. The opposite open ends are shown at 26 and 27, the former being the upper opening and the latter being the lower.

The glass wall of the greenhouse is indicated at 22 and the foundation at 21. The outer wall of ventilator 23 is extended downwardly and pivotally mounted on an axis 29—in this instance on the foundation wall 21. As in all the various forms of ventilators herein described, there are two oppositely disposed walls.

In the ventilators 23 of FIGS. 5 to 14, the inner and outer walls have a fixed relation to each other. Specifically, the ventilators of the alternate embodiments of FIGS. 7 to 17 are conveniently numbered 23a through 23k, respectively.

FIG. 6, which is an end view of the form shown in FIG. 5 shows the ventilator 23 as having parallel inner and outer walls 24 and 28 respectively.

In FIG. 7 the inner wall, 24a is shorter than the outer wall, though parallel thereto.

In FIG. 8 the inner wall 24b is at a rather acute angle with the outer wall while in FIG. 9 the wall 24c is not so sharply inclined to the outer wall.

In FIG. 10, the inner wall 24d has a break to flare inwardly at the top and in FIG. 11 the inner wall 24e flares inwardly, not only at the top but at the bottom with a parallel section in between.

In FIG. 12, the inner wall 24f omits the intermediate parallel section of FIG. 11.

In FIG. 13, the inner wall 24g is provided with a number of breaks approximating a curve convex to the opposed outer wall. The outer wall is also flared so that in most closed positions of ventilator 23g, a smaller inner and outer opening is provided.

In FIG. 14, the inner wall 24h is in the form of a true curve approximating the broken outline 24g.

In FIG. 15, ventilator 23i is shown pivoted at a horizontal axis 29', raised above the foundation, while in FIG. 17 ventilator 23k is indicated with its pivot 29 mounted at the level of the top of the foundation.

In FIG. 16, the pivot 29" of ventilator 23j is centrally located so that the lower part of the outer wall swings in while the upper part swings out.

Any of the forms of ventilator 23 may be used to advantage but the preferred form is shown in FIG. 18 which shows the ventilator 23b as illustrated in FIG. 8. The pivot 29 is at the base of the wall 21. In this figure, there is diagrammatically represented a greenhouse equipped with the air conditioning system of the invention.

Within the greenhouse is provided a bench 63 for the support of growing materials such as the potted plants 20 for the benefit of which the air within the greenhouse is to be conditioned.

Situated in rather close proximity to the walls of the greenhouse and its roof are a plurality of steam pipe units 32, there being one of these at each side wall and others above the bench 63. A very important effect of the pipe units 32 is to counteract the cooling effect of the glass walls.

At the far side of the greenhouse with rspeect to ventilator 23 is a heating unit 31 whose main purpose is to cause an up current of air by convection. By this system air is adapted to enter the ventilator 23, pass below the bench 63, in the direction shown by the arrows 57. Under the influence of heating element 31 the air is caused to rise as indicated by the arrow 58. The steam heating elements 32 prevent the air from cooling off by proximity to the greenhouse walls. In the adjusted position of ventilator 23 (which may be said to be half way open or approximately so), air is adapted to enter as indicated by arrow 69 into the space 53 which may be said to be the inlet due to the outer wall of the ventilator 23 being tilted out from the greenhouse side wall. Jet 30 entrains such air and propels it in the direction of arrow 56, at the same time drawing air from the inside for recirculation as indicated by arrow 54. Such recirculated air has been heated by the heating element 31. The admixture of warm recirculated air and the cooler outside air will together flow in a current under bench 63 being joined by some recirculated air which will find its way by way of a path indicated by arrow 54a. Such water, from jet 30, not finely enough divided to be carried by the air stream, will collect on a screen 67 at the lower portion of ventilator 23 and be collected for reuse by way of return pipes 68.

Inasmuch as air is introduced at the entrance 53 to ventilator 23, some air must be evacuated from the greenhouse. This is preferably accomplished by a vent 64 hinged at the peak of the greenhouse roof where it may find its way to the outer atmosphere by way of the opening 35 and as indicated by the arrow 131. The vent, being adjustable and adjustably hinged, regulates the amount of air exhausted from the house and is one of the controlling elements to determine the relative amounts of air recirculated and admitted from the outside at ventilator 23.

The wall section 66 which extends between the inner and outer walls of ventilator 23 acts as a guide vane to direct the air flow to the water jet 30. The guided air is thus positively directed into space 62 below benches 63.

It is likely that not all of the air passing from under the benches will go into the heating element 31 and what is by-passed as indicated by the arrow 57a will flow in a path indicated by arrow 58 to merge with the rest at the arrow 59. The greater part of the circulation will be as indicated by arrows 61 above the potted plants 20.

It has been found in practice that this system is very easily manipulated and produces excellent results with the advantages above referred to.

I claim:

1. A ventilator adapted to be installed in a wall opening of an enclosed space, said ventilator including an inner wall and an outer wall juxtaposed in substantially side-by-side relationship with respect to each other, the outer wall being directed upwardly and outwardly to form an air entrance from outside the said space and the inner wall being directed upwardly and inwardly to provide an entrance for air from within the space, both such entrances being at the upper ends of said walls, said walls forming a common channel therebetween for the commingling of air introduced at said entrances and forming a bottom exit solely into the space to be ventilated.

2. A ventilator as set forth in claim 1 in which said outer wall is pivoted about a horizontal axis substantially below the upper end of the ventilator.

3. A ventilator as set forth in claim 1 which is provided with a waterspray device between said ventilator walls and directed downwardly to enhance an air flow therebetween.

4. A ventilator as set forth in claim 2 in which both said ventilator walls are angularly directed and fixed with respect to each other.

5. A ventilator as set forth in claim 3 in which a screen is provided at the exit of said ventilator to trap water particles from said spray.

6. A ventilating arrangement for glass walled greenhouses and the like having a bench for supporting plants, which includes a ventilator mounted in an outer vertical wall opening on said greenhouse and having an inner wall and an outer wall fixedly spaced apart to form upper and lower interconnected apertures for receiving air and discharging such air into the greenhouse interior at the floor level below said bench, said ventilator outer wall being hinged at its lower edge at the greenhouse wall and swingable outwardly, a heater in said greenhouse remote from said ventilator to cause an upward flow of air adjacent a wall of the greenhouse, and a water spray in said ventilator directed downwardly to entrain air from the upper aperture thereof and to direct such air in a stream below said bench toward said heater.

References Cited in the file of this patent

UNITED STATES PATENTS

| | | |
|---|---|---|
| 338,304 | Sayers | Mar. 23, 1886 |
| 1,009,173 | Pomerantz | Nov. 21, 1911 |
| 1,429,973 | Roesch | Sept. 26, 1922 |
| 1,827,530 | Le Grand | Oct. 13, 1931 |
| 1,836,852 | Kubatzky | Dec. 15, 1931 |
| 2,202,339 | Dresser et al. | May 28, 1940 |
| 2,600,752 | Gettins | July 17, 1952 |
| 2,701,515 | Rinker | Feb. 8, 1955 |

FOREIGN PATENTS

| | | |
|---|---|---|
| 122,219 | Sweden | July 13, 1948 |
| 566,820 | Great Britain | Jan. 16, 1945 |
| 580,329 | Great Britain | Sept. 4, 1946 |